US010651882B2

(12) United States Patent
Cho et al.

(10) Patent No.: US 10,651,882 B2
(45) Date of Patent: May 12, 2020

(54) CASE FOR ELECTRONIC DEVICE

(71) Applicant: Samsung Electronics Co., Ltd., Suwon-si, Gyeonggi-do (KR)

(72) Inventors: Chul In Cho, Suwon-si (KR); Sang Won Lee, Hwaseong-si (KR); Heon Yeap Baek, Suwon-si (KR); Deok Whan Cha, Hwaseong-si (KR); Tae Seuk Kang, Suwon-si (KR); Eun Sun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/318,554

(22) PCT Filed: May 24, 2017

(86) PCT No.: PCT/KR2017/005382
§ 371 (c)(1),
(2) Date: Jan. 17, 2019

(87) PCT Pub. No.: WO2018/016729
PCT Pub. Date: Jan. 25, 2018

(65) Prior Publication Data
US 2019/0319661 A1 Oct. 17, 2019

(30) Foreign Application Priority Data

Jul. 20, 2016 (KR) .................. 10-2016-0092262
Mar. 28, 2017 (KR) .................. 10-2017-0039559

(51) Int. Cl.
*H04B 1/3888* (2015.01)
*A45C 11/00* (2006.01)
(Continued)

(52) U.S. Cl.
CPC ............ *H04B 1/3888* (2013.01); *A45C 11/00* (2013.01); *A45C 13/002* (2013.01); *A45C 13/04* (2013.01);
(Continued)

(58) Field of Classification Search
CPC .. H04B 1/3888; H04M 1/0202; H04M 1/185; H05K 5/02; A45C 13/04; A45C 13/002;
(Continued)

(56) References Cited

U.S. PATENT DOCUMENTS 9,391,663 B2   7/2016   Yun et al.
10,098,430 B2  10/2018  Pakr et al.
2010/0326995 A1  12/2010  Tang
(Continued)

FOREIGN PATENT DOCUMENTS

KR   20-0454685 Y1   7/2011
KR   10-1183278 B1   9/2012
(Continued)

OTHER PUBLICATIONS

Extended European Search Report dated Mar. 6, 2019, issued in European Patent Application No. 17831203.9.

*Primary Examiner* — Nizar N Sivji
(74) *Attorney, Agent, or Firm* — Jefferson IP Law, LLP

(57) ABSTRACT

A case for an electronic device includes a fastening part attachable and detachable to and from at least part of the electronic device, a cover that covers a first surface of the electronic device that faces a first direction, with the cover in a closed state, and a connecting part that connects the fastening part and the cover. The cover includes a base plate and a soft material part disposed in a second direction from the base plate, with the cover in the closed state, the second direction being opposite to the first direction, wherein at least a portion of the soft material part makes contact with the first surface of the electronic device.

16 Claims, 14 Drawing Sheets

(51) Int. Cl.
  *A45C 13/00*   (2006.01)
  *A45C 13/04*   (2006.01)
  *H04M 1/02*    (2006.01)
  *H04M 1/18*    (2006.01)
  *H05K 5/02*    (2006.01)

(52) U.S. Cl.
  CPC ......... *H04M 1/0202* (2013.01); *H04M 1/185* (2013.01); *H05K 5/02* (2013.01); *A45C 2011/002* (2013.01); *A45C 2011/003* (2013.01)

(58) Field of Classification Search
  CPC .............. A45C 11/00; A45C 2011/002; A45C 2011/003
  See application file for complete search history.

(56) References Cited

U.S. PATENT DOCUMENTS

| | | |
|---|---|---|
| 2014/0202603 A1 | 7/2014 | Huang |
| 2016/0142090 A1 | 5/2016 | Yun et al. |
| 2017/0127780 A1* | 5/2017 | Pakr ........................ A45C 11/00 |
| 2017/0279477 A1* | 9/2017 | Adjesson .............. H04M 1/185 |
| 2018/0164847 A1* | 6/2018 | Igarashi ................... G06F 1/16 |

FOREIGN PATENT DOCUMENTS

| | | |
|---|---|---|
| KR | 10-1197173 B1 | 11/2012 |
| KR | 10-2013-0094274 A | 8/2013 |
| KR | 10-2014-0127383 A | 11/2014 |
| KR | 20-2015-0000529 U | 2/2015 |
| KR | 10-1606493 B1 | 3/2016 |
| WO | 2016/006720 A1 | 1/2016 |

\* cited by examiner

CASE FOR ELECTRONIC DEVICE

TECHNICAL FIELD

The present disclosure relates to a case that is used in combination with an electronic device.

BACKGROUND ART

With the development of electronic technologies, various types of electronic devices have been developed. In particular, portable electronic devices such as smartphones, tablet PCs, and the like that are easy to carry have been widely used in recent years.

Portable electronic devices may be damaged by dropping or striking due to their portable nature. Accordingly, users cover their portable electronic devices with cases to prevent damage to the electronic devices.

Cases applicable to portable electronic devices are broadly divided into a case that protects a side surface or a rear surface of an electronic device and a flip type case that protects a front surface of an electronic device through which a display screen is provided, as well as a side surface or a rear surface of the electronic device.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

Among the cases applicable to the portable electronic devices, the case that protects only the side surface or the rear surface of the electronic device may be vulnerable to damage since it is open at the front. Meanwhile, in the case of the flip type case, the front surface of the electronic device may be scratched by foreign matter present between the cover and the electronic device while the cover is closed.

Aspects of the present disclosure are to address at least the above-mentioned problems and/or disadvantages and to provide at least the advantages described below. Accordingly, an aspect of the present disclosure is to provide a case for protecting the front of a portable electronic device and preventing scratches due to foreign matter.

Technical Solution

According to an embodiment of the present disclosure, a case for an electronic device includes a fastening part attachable and detachable to and from at least part of the electronic device, a cover that covers a first surface of the electronic device that faces a first direction, with the cover in a closed state, and a connecting part that connects the fastening part and the cover. The cover includes a base plate and a soft material part disposed in a second direction from the base plate, with the cover in the closed state, the second direction being opposite to the first direction, wherein at least a portion of the soft material part makes contact with the first surface of the electronic device.

In addition, according to an embodiment of the present disclosure, at least a portion of a first surface of the base plate that faces the first direction has a curved surface shape, and an area of a second surface of the base plate that faces the second direction and makes contact with the soft material part has a flat surface shape.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to various embodiments of the present disclosure, a movement of the cover may be suppressed, thereby preventing scratches due to foreign matter present between the cover and the electronic device.

Besides, a variety of effects directly or indirectly understood through this disclosure may be provided.

BEST MODE

Figure 1:
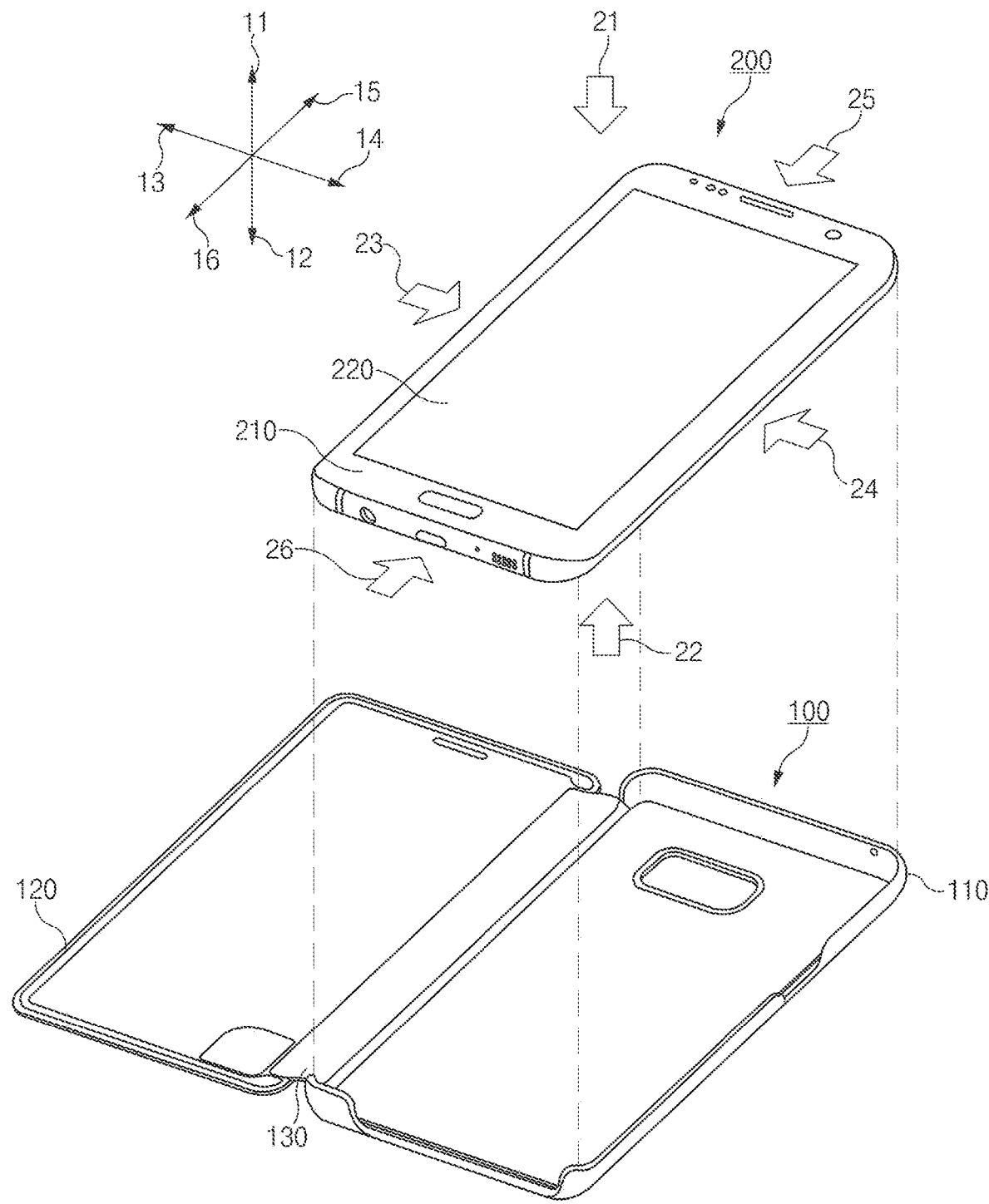
FIG. 1 is a view illustrating a case and the appearance of an electronic device according to an embodiment of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

FIG. 1 is a view illustrating a case 100 and the appearance of an electronic device 200 according to an embodiment of the present disclosure.

Referring to FIG. 1, the electronic device 200 according to an embodiment may include a housing 210 and a display (or a display device) 220. Various circuits or modules, such as a processor, a memory, and the like, may be arranged inside the electronic device 200 (or inside the housing 210).

According to an embodiment, the housing 210 may form at least part of the appearance of the electronic device 200. For example, the housing 210 may include a front surface 21 facing an upper direction 11, a rear surface 22 opposite the front surface 21, and side surfaces surrounding at least some space between the front surface 21 and the rear surface 22. The side surfaces may include a left-side surface 23 facing a left-side direction 13, a right-side surface 24 facing a right-side direction 14, an upper-side surface 25 facing an upper-side direction 15, and a bottom-side surface 26 facing a bottom-side direction 16.

According to an embodiment, the housing 210 may be formed of an injection-molded plastic material, a conductive material (e.g., metal), or a combination thereof to protect various components inside the electronic device 200 from external shocks or dust. According to an embodiment, the housing 210 may also be used to refer to outer surfaces of a plurality of components. For example, the front surface of the housing 210 may correspond to a cover glass, the side surfaces of the housing 210 may correspond to side members of a rear case (or a rear plate), and the rear surface of the housing 210 may correspond to a back cover of a battery.

According to an embodiment, the display 220 may be disposed on at least one surface of the electronic device 200. For example, the display 220 may be disposed in between the front surface (the first surface) 21 facing the upper direction (the first direction) 11 and the rear surface (the second surface) 22 facing the lower direction (the second direction) 12 and may be exposed to the outside through the front surface 21.

According to an embodiment, the display 220 may output contents (e.g., text, an image, a video, an icon, a widget, or a symbol) or may receive a touch input (including a touch, hovering, or a "force touch") from a user. To this end, the display 220 may include, for example, a cover glass, a display panel, a touch panel, a fingerprint sensor, and/or a pressure sensor. The cover glass, the display panel, the touch panel, the fingerprint sensor, and/or the pressure sensor may be additively arranged with corresponding areas (e.g., substantially the same areas).

According to an embodiment, the display 220 may be disposed on the front surface of the electronic device 200 and may further expand from the front surface to at least one side surface of the electronic device 200. For example, the display 220 may expand in the left-side direction 13 and/or the right-side direction 14 and may be exposed to the outside through the left-side surface 23 and/or the right-side surface 24, as well as the front surface 21. In another example, the display 220 may expand in the upper-side direction 15 and/or the bottom-side direction 16 and may be exposed to the outside through the upper-side surface 25 and/or the bottom-side surface 26, as well as the front surface 21.

Referring to FIG. 1, according to an embodiment, the case 100 may include a fastening part 110, a cover 120, and a connecting part 130. According to an embodiment, the case 100 may be combined with the electronic device 200 by the fastening part 110. According to an embodiment, the fastening part 110 may be attachable and detachable to and from at least part of the electronic device 200. For example, the fastening part 110 may be coupled to at least some of the rear surface 22, the left-side surface 23, the right-side surface 24, the upper-side surface 25, and the bottom-side surface 26 of the electronic device 200.

According to an embodiment, the cover 120 may be in an open or closed state according to a movement of the connecting part 130. According to an embodiment, the cover 120 in the closed state may cover the front surface 21 of the electronic device 200 that faces the first direction 11. According to an embodiment, at least a part of components of the cover 120 may include a transparent (or translucent) material. For example, an area of the cover 120 that corresponds to the display 220, which is exposed through the front surface 21 of the electronic device 200 with the cover 120 in a closed state, may be formed of a transparent (or translucent) material. Accordingly, the user may view images (or contents) displayed on the display 220 of the electronic device 200 even while the cover 120 is closed.

According to an embodiment, the connecting part 130 may connect the fastening part 110 and the cover 120. For example, the connecting part 130 may be attached to at least a partial area of the fastening part 110 and at least a partial area of the cover 120 to connect the fastening part 110 and the cover 120. In another example, the connecting part 130 may extend from at least one of the fastening part 110 and the cover 120 to connect the fastening part 110 and the cover 120.

According to an embodiment, the connecting part 130 may connect the fastening part 110 and the cover 120 through one side surface of the fastening part 110. For example, the connecting part 130 may connect the fastening part 110 and the cover 120 through a left-side surface of the fastening part 110. In another example, the connecting part 130 may connect the fastening part 110 and the cover 120 through an upper-side, right-side, or bottom-side surface of the fastening part 110. According to an embodiment, the connecting part 130 may have a hingedly-moved structure. The connecting part 130 may allow the cover 120 to swing open or close.

Figure 2:
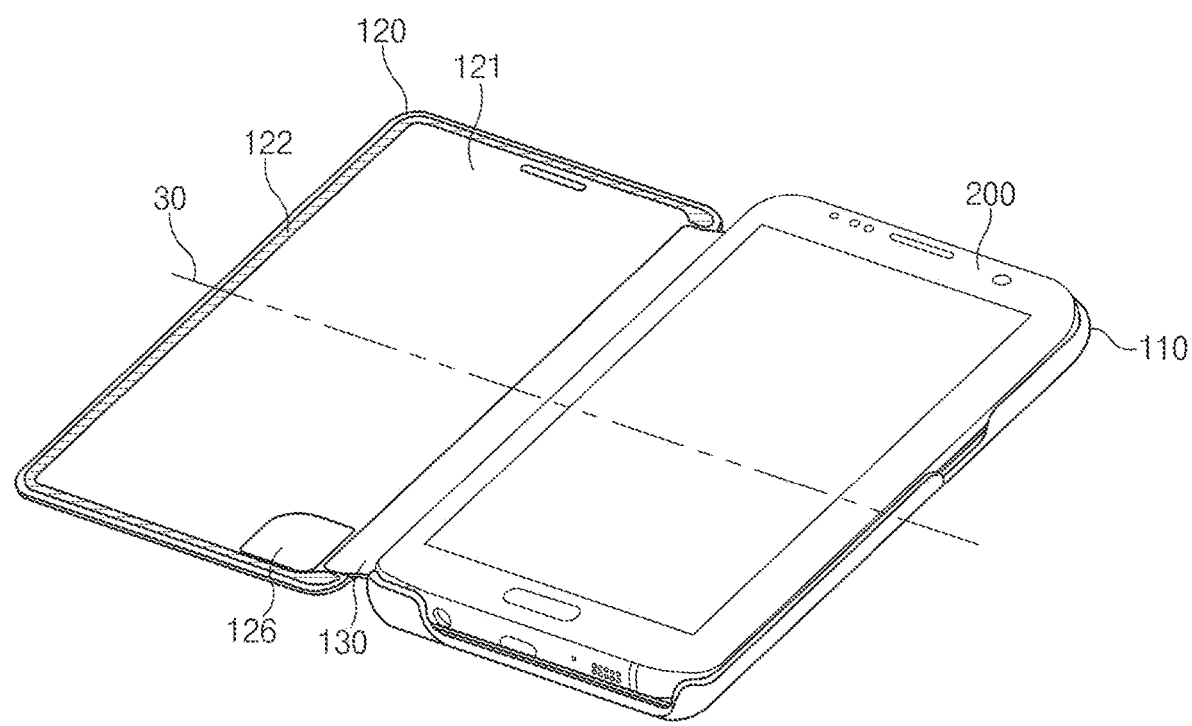
FIG. 2 is a view illustrating the structure of the case combined with the electronic device according to an embodiment of the present disclosure.

FIG. 2 is a view illustrating the structure of the case 100 combined with the electronic device 200 according to an embodiment of the present disclosure.

FIG. 2 illustrates, for example, a state in which the cover 120 is open after the case 100 and the electronic device 200 of FIG. 1 are combined together. Referring to FIG. 2, the fastening part 110 may be coupled to at least one surface (e.g., the rear surface and the side surfaces) of the electronic device 200. According to an embodiment, the cover 120 may be in the open state according to a movement of the connecting part 130. According to an embodiment, the cover 120 may include a base plate 121 and a soft material part 122.

According to an embodiment, the base plate 121 may include a material with a relatively higher hardness than that of the soft material part 122. According to an embodiment, to protect the electronic device 200, the base plate 121 may be formed of a material that is excellent in physical properties (e.g., rigidity, wear resistance, corrosion resistance, and impact resistance). For example, the base plate 121 may include at least one of polycarbonate (PC) and acrylonitrile butadiene styrene (ABS).

According to an embodiment, the base plate 121 may be formed of a transparent (or translucent) material. For example, the base plate 121 may transmit light emitted from a display (e.g., the display 220 of FIG. 1) of the electronic device 200. Accordingly, the user may view contents displayed on the display of the electronic device 200 even while the cover 120 is closed.

According to an embodiment, the soft material part 122 may include a material with a relatively lower hardness than that of the base plate 121. According to an embodiment, the soft material part 122 may be formed of a material that can be deformed by an external force and has a restoring force. For example, the soft material part 122 may include at least one of silicone, rubber, thermoplastic elastomer (TPE), and thermoplastic silicone vulcanizate (TPSiV).

According to an embodiment, the soft material part 122 may be formed of a material that has a specified coefficient of friction or more with respect to a first surface (e.g., the first surface 21 of FIG. 1) of the electronic device 200 when making contact with the first surface of the electronic device 200. For example, the soft material part 122 may be formed of a material that has a specified coefficient of friction or more with respect to the cover glass or the housing of the electronic device 200 when the soft material part 122 makes contact with the cover glass or the housing of the electronic device 200, with the cover 120 in a closed state. For example, the soft material part 122 may include at least one of silicone, rubber, thermoplastic elastomer (TPE), and thermoplastic silicone vulcanizate (TPSiV).

According to an embodiment, the soft material part 122 may be disposed in a second direction (e.g., the second direction 12 of FIG. 1) from the base plate 121, with the cover 120 in a closed state (or may be disposed in a first direction (e.g., the first direction 11 of FIG. 1) from the base plate 121, with the cover 120 in an open state), in which the second direction is opposite to the first direction. For example, the soft material part 122 may be disposed to face the first surface (e.g., the first surface 21 of FIG. 1) of the electronic device 200, with the cover 120 in the closed state.

According to an embodiment, the soft material part 122 may have a ring shape or a broken ring shape (or a band shape with opposite ends not being connected together). According to an embodiment, the soft material part 122 may be disposed in an edge area on at least one side of the base plate 121. For example, in the case where the soft material part 122 has a ring shape, the soft material part 122 may be disposed in edge areas on the four sides of the base plate 121. In another example, in the case where the soft material part 122 has a broken ring shape, the soft material part 122 may be disposed in edge areas on the remaining sides of the base plate 121 other than the side connected to the fastening part 110 through the connecting part 130. According to an embodiment, the soft material part 122 may be spaced a specified distance or more inward from the edge of the fastening part 110.

According to an embodiment, the cover 120 may further include a magnetic material 126. According to an embodiment, the magnetic material 126 may be disposed in the second direction (e.g., the second direction 12 of FIG. 1), which is opposite to the first direction (e.g., the first direction 11 of FIG. 1), from the base plate 121 with the cover 120 in a closed state. For example, the magnetic material 126 may be disposed to face the first surface (e.g., the first surface 21 of FIG. 1) of the electronic device 200, with the cover 120 in the closed state.

According to an embodiment, the magnetic material 126 may generate a magnetic field. A first Hall sensor disposed on the first surface of the electronic device 200 may detect the intensity of the magnetic field generated by the magnetic material 126. The intensity of the magnetic field detected by the first Hall sensor may vary according to a movement of the cover 120, and the electronic device 200 may detect whether the cover 120 is open or closed, based on the intensity of the magnetic field. According to an embodiment, the soft material part 122 may be disposed so as not to overlap the magnetic material 126.

Figure 3:
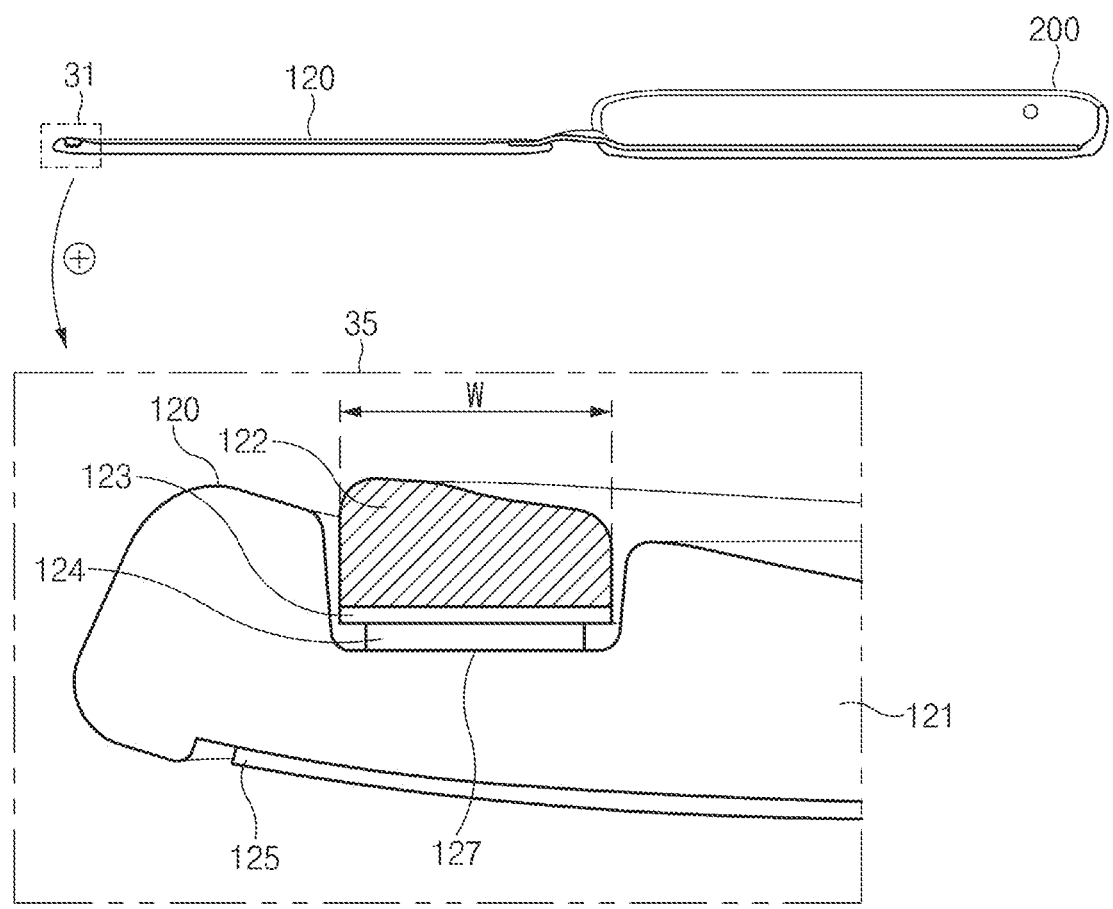
FIG. 3 is a sectional view illustrating the case combined with the electronic device according to an embodiment of the present disclosure.

FIG. 3 is a sectional view illustrating the case 100 combined with the electronic device 200 according to an embodiment of the present disclosure.

The sectional view illustrated in FIG. 3 may correspond to an example of a section obtained by cutting the case 100 illustrated in FIG. 2, which is combined with the electronic device 200, along a line 30 across the case 100. Referring to an enlarged image 35 of a partial area 31 of the cover 120 in the sectional view of FIG. 3, the cover 120 may include the base plate 121, the soft material part 122, an intermediate film 123, an adhesive film 124, and a surface film 125. According to an embodiment, at least one of the base plate 121, the soft material part 122, the intermediate film 123, the adhesive film 124, and the surface film 125 may include a transparent material.

According to an embodiment, the base plate 121 may include a fixing groove 127. According to an embodiment, the soft material part 122 may be inserted into the fixing groove 127 and combined with the base plate 121. According to an embodiment, the fixing groove 127 may have a ring shape or a broken ring shape (or a band shape with opposite ends not being connected together). According to an embodiment, the fixing groove 127 may be formed along an edge on at least one side of the base plate 121. For example, in the case where the fixing groove 127 has a ring shape, the fixing groove 127 may be formed along edges on the four sides of the base plate 121. In another example, in the case where the fixing groove 127 has a broken ring shape, the fixing groove 127 may be formed along edges on the remaining sides of the base plate 121 other than the side connected to the fastening part 110 through the connecting part 130.

According to an embodiment, the intermediate film 123 may be disposed between the base plate 121 and the soft material part 122. For example, the intermediate film 123 may be disposed in a first direction (e.g., the first direction 11 of FIG. 1) from the soft material part 122, with the cover 120 in a closed state (or may be disposed in a second direction (e.g., the second direction 12 of FIG. 1) from the soft material part 122, with the cover 120 in an open state).

According to an embodiment, the intermediate film 123 may be used as a base material for forming the soft material part 122 in the manufacturing process. For example, the soft material part 122 may be formed on the intermediate film 123 in the manufacturing process. When the soft material part 122 is attached to the base plate 121 using the adhesive film 124, the adhesive force may be weak due to an adhesive property difference between the base plate 121 and the soft material part 122 in the case where the intermediate film 123 is not present between the base plate 121 and the soft material part 122. According to an embodiment, the intermediate film 123 may be formed of a material with the same adhesive property as, or an adhesive property similar to, that of the base plate 121 to ensure the adhesive force of the adhesive film 124 between the base plate 121 and the soft material part 122. For example, the intermediate film 123 may include at least one of polycarbonate (PC), acrylonitrile butadiene styrene (ABS), and polyethylene terephthalate (PET).

According to an embodiment, the adhesive film 124 may be disposed between the base plate 121 and the intermediate film 123 to bond the base plate 121 and the intermediate film 123. That is, the soft material part 122 may be attached to the base plate 121 through the intermediate film 123 and the adhesive film 124.

According to an embodiment, the soft material part 122 may be directly attached to the base plate 121 without the intermediate film 123 and the adhesive film 124. For example, the soft material part 122 may be formed on the base plate 121 by double injection molding and may be attached to the base plate 121 without the intermediate film 123 and the adhesive film 124.

According to an embodiment, the soft material part 122 may have a width w ranging from 0.4 mm to 10 mm. According to an embodiment, the width w of the soft material part 122 may be determined based on the coefficient of friction between the soft material part 122 and a first surface (e.g., the first surface 21 of FIG. 1) of the electronic device 200 when the soft material part 122 makes contact with the first surface of the electronic device 200. For example, the width w of the soft material part 122 may be set to be narrower with an increase in the coefficient of friction between the soft material part 122 and the first surface and may be set to be wider with a decrease in the coefficient of friction between the soft material part 122 and the first surface.

According to an embodiment, the surface film 125 may be disposed in the first direction (e.g., the first direction 11 of FIG. 1) from the base plate 121, with the cover 120 in a closed state (or may be disposed in the second direction (e.g., the second direction 12 of FIG. 1) from the base plate 121, with the cover 120 in an open state).

According to an embodiment, the surface film 125 may have a graphic pattern formed in at least a partial area thereof. According to an embodiment, the surface film 125 may have a specified color. The overall color of the cover 120 may be determined by the surface film 125.

According to an embodiment, to protect the cover 120 from the outside, the surface film 125 may be formed of a material that is excellent in physical properties (e.g., wear resistance, corrosion resistance, and impact resistance). For example, the surface film 125 may include polyethylene terephthalate (PET) to make the surface of the cover 120 hard. In the case where the surface film 125 includes PET, the surface film 125 may have, for example, a hardness of 1H or more. In another example, the surface film 125 may include at least one of polyethylene (PE) and urethane to make the surface of the cover 120 soft. In the case where the surface film 125 includes at least one of PE and urethane, the surface film 125 may have, for example, a hardness of 6B or less.

Figure 4:
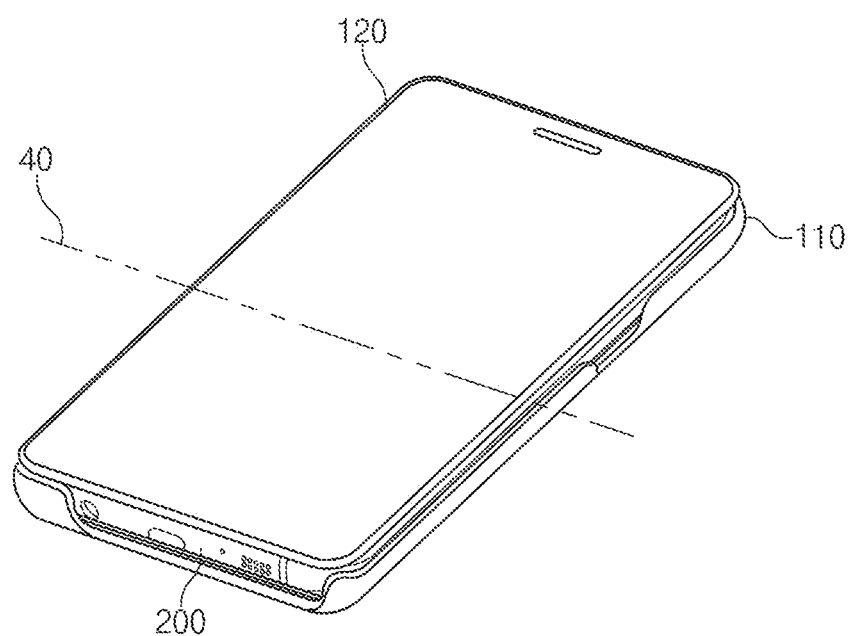
FIG. 4 is a view illustrating the structure of the case combined with the electronic device according to an embodiment of the present disclosure.

FIG. 4 is a view illustrating the structure of the case 100 combined with the electronic device 200 according to an embodiment of the present disclosure.

FIG. 4 illustrates, for example, a state in which the cover 120 is closed after the case 100 and the electronic device 200 of FIG. 1 are combined together. Referring to FIG. 4, the fastening part 110 may be coupled to at least one surface (e.g., the rear surface and the side surfaces) of the electronic device 200. According to an embodiment, the cover 120 may be in the closed state according to a movement of the connecting part 130.

Figure 5:
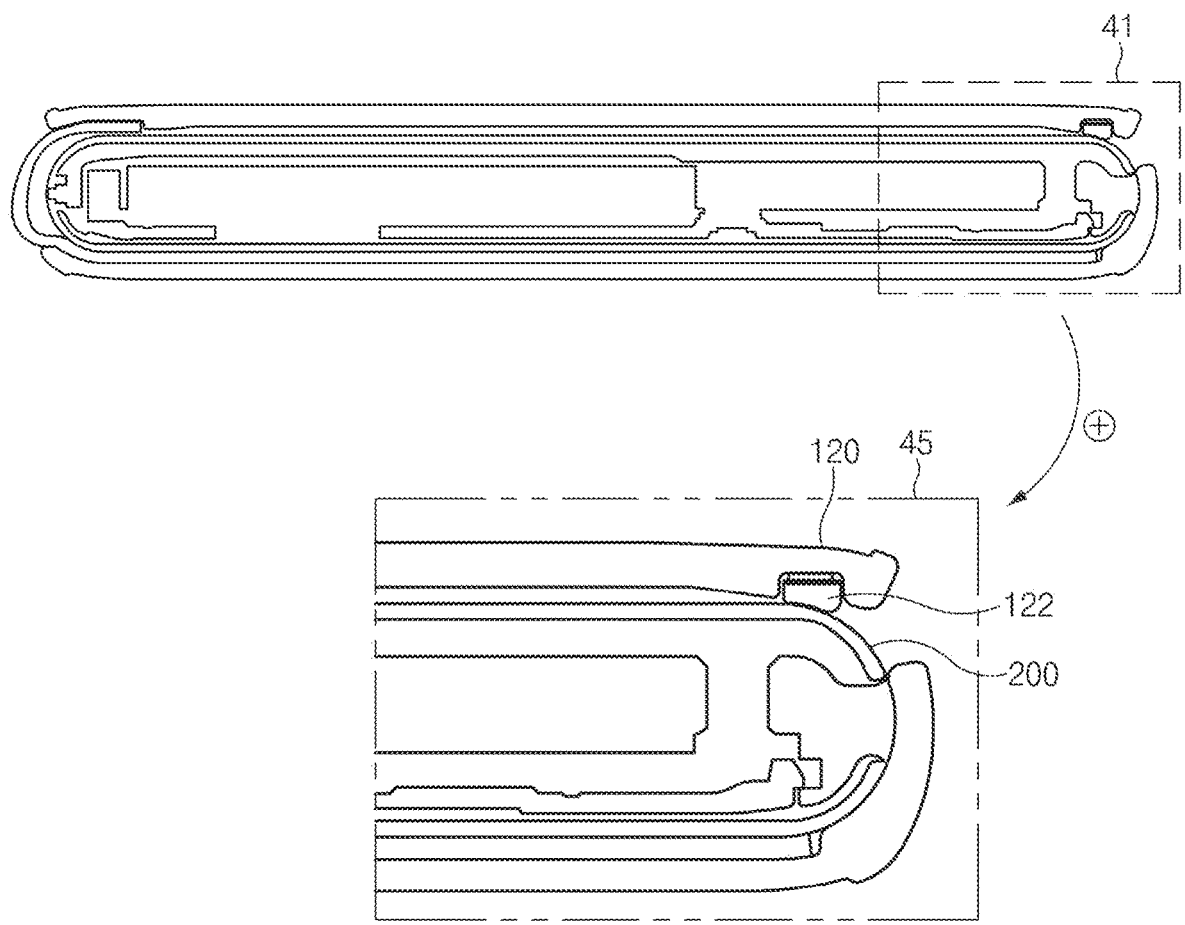
FIG. 5 is a sectional view illustrating the case combined with the electronic device according to an embodiment of the present disclosure.

FIG. 5 is a sectional view illustrating the case 100 combined with the electronic device 200 according to an embodiment of the present disclosure.

The sectional view illustrated in FIG. 5 may correspond to an example of a section obtained by cutting the case 100 illustrated in FIG. 4, which is combined with the electronic device 200, along a line 40 across the case 100. Referring to an enlarged image 45 of a partial area 41 in the sectional view of FIG. 5, the soft material part 122 included in the cover 120 may make contact with the electronic device 200, with the cover 120 in the closed state. For example, the soft material part 122 may make contact with a first surface (e.g., the cover glass or the housing) of the electronic device 200.

According to an embodiment, the soft material part 122 and the first surface of the electronic device 200 may have a specified coefficient of friction or more therebetween. The soft material part 122 may make contact with the first surface of the electronic device 200 to prevent a movement of the cover 120. The movement of the cover 120 may be more effectively prevented by increasing the coefficient of friction or the contact area between the soft material part 122 and the first surface of the electronic device 200. Even though foreign matter enters between the cover 120 and the electronic device 200, scratches due to the foreign matter may be suppressed by restricting the movement of the cover 120 by the soft material part 122.

Figure 6:
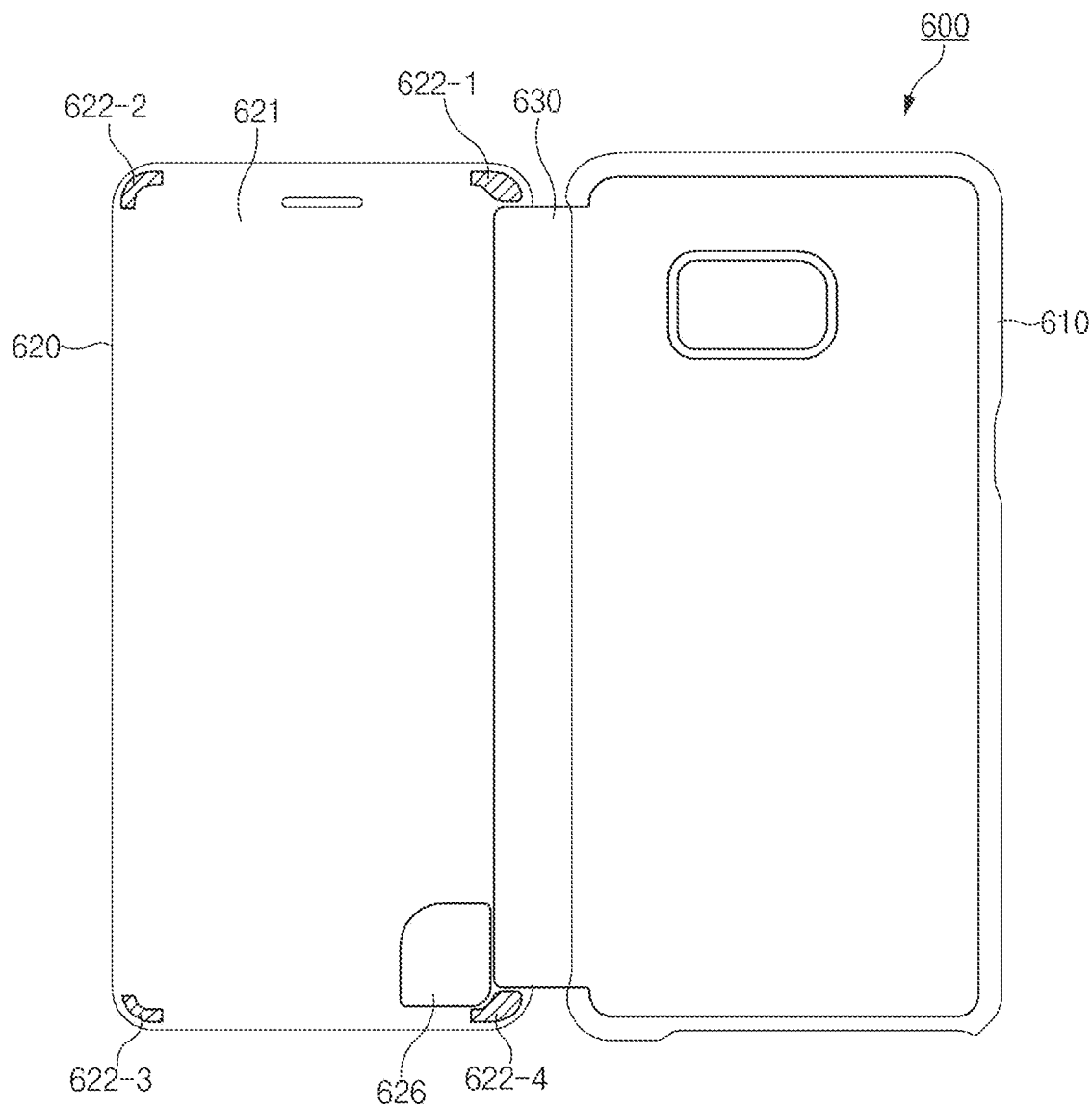
FIG. 6 is a view illustrating the structure of a case according to an embodiment of the present disclosure.

FIG. 6 is a view illustrating the structure of a case 600 according to an embodiment of the present disclosure.

Referring to FIG. 6, the case 600 may include a fastening part 610, a cover 620, and a connecting part 630. According to an embodiment, the cover 620 may include a base plate 621 and soft material parts 622-1, 622-2, 622-3, and 622-4. All the components of the case 600 illustrated in FIG. 6 except for the soft material parts 622-1, 622-2, 622-3, and 622-4 are the same as, or similar to, those of the case 100 described above with reference to FIGS. 1 to 5. Therefore, the following descriptions of the soft material parts 622-1, 622-2, 622-3, and 622-4 will be focused on the difference from the soft material part 122.

According to an embodiment, the soft material parts 622-1, 622-2, 622-3, and 622-4 may be disposed in a second direction (e.g., the second direction 12 of FIG. 1) from the base plate 621, with the cover 620 in a closed state (or may be disposed in a first direction (e.g., the first direction 11 of FIG. 1) from the base plate 621, with the cover 120 in an open state), in which the second direction is opposite to the first direction. For example, the soft material parts 622-1, 622-2, 622-3, and 622-4 may be disposed to face a first surface (e.g., the first surface 21 of FIG. 1) of an electronic device (e.g., the electronic device 200 of FIG. 1), with the cover 120 in the closed state.

According to an embodiment, the soft material parts 622-1, 622-2, 622-3, and 622-4 may be disposed on at least one corner of the base plate 621. For example, the four soft material parts 622-1, 622-2, 622-3, and 622-4 may be disposed on the four corners of the base plate 621, respectively. In another example, the two soft material parts 622-2 and 622-3 may be disposed on the upper left corner and the lower left corner of the base plate 621, respectively. According to an embodiment, the soft material parts 622-1, 622-2, 622-3, and 622-4 may be disposed so as not to overlap a magnetic material 626 included in the cover 620.

Figure 7:
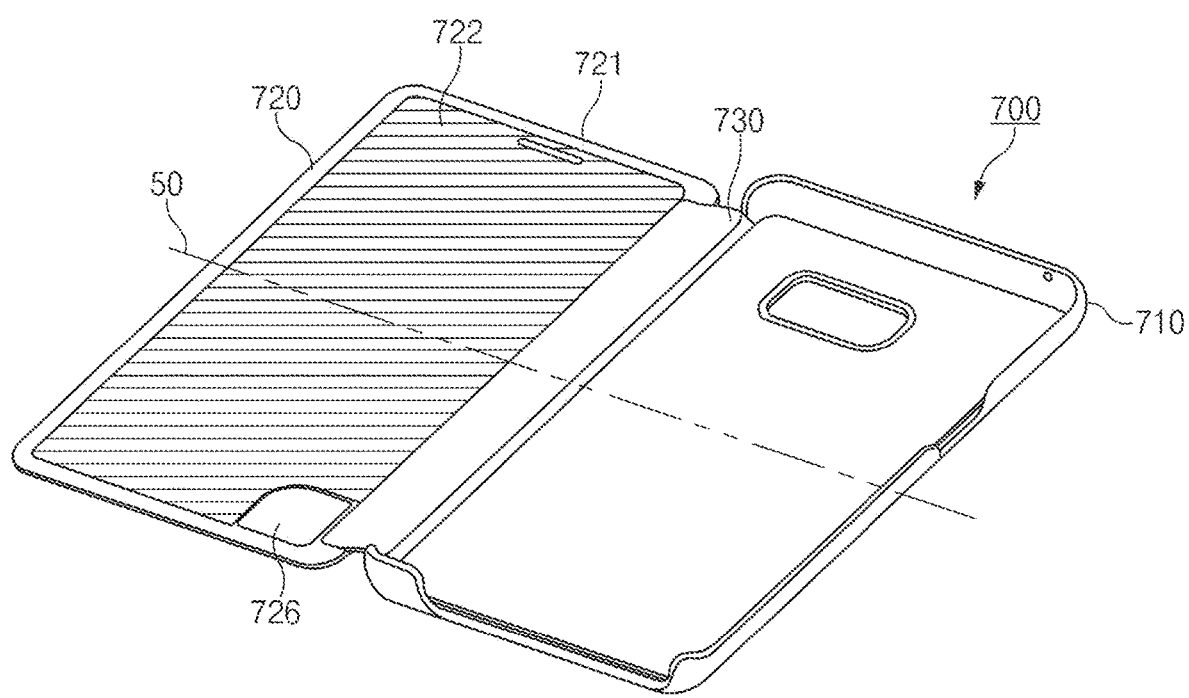
FIG. 7 is a view illustrating the structure of a case according to an embodiment of the present disclosure.

FIG. 7 is a view illustrating the structure of a case 700 according to an embodiment of the present disclosure.

Referring to FIG. 7, the case 700 may include a fastening part 710, a cover 720, and a connecting part 730. According to an embodiment, the cover 720 may include a base plate 721 and a soft material part 722. All the components of the case 700 illustrated in FIG. 7 except for the base plate 721 and the soft material part 722 are the same as, or similar to, those of the case 100 described above with reference to FIGS. 1 to 5. Therefore, the following descriptions of the base plate 721 and the soft material part 722 will be focused on the difference from the base plate 121 and the soft material part 122.

According to an embodiment, the soft material part 722 may be disposed in a second direction (e.g., the second direction 12 of FIG. 1), which is opposite to a first direction (e.g., the first direction 11 of FIG. 1), from the base plate 721 with the cover 720 in a closed state. For example, the soft material part 722 may be disposed to face a first surface (e.g., the first surface 21 of FIG. 1) of an electronic device (e.g., the electronic device 200 of FIG. 1), with the cover 720 in the closed state.

According to an embodiment, the soft material part 722 may have a flat or curved surface shape. According to an embodiment, the soft material part 722 may be disposed in an area including the center of the base plate 721. According to an embodiment, the soft material part 722 may be disposed so as not to overlap a magnetic material 726 included in the cover 720.

Figure 8:
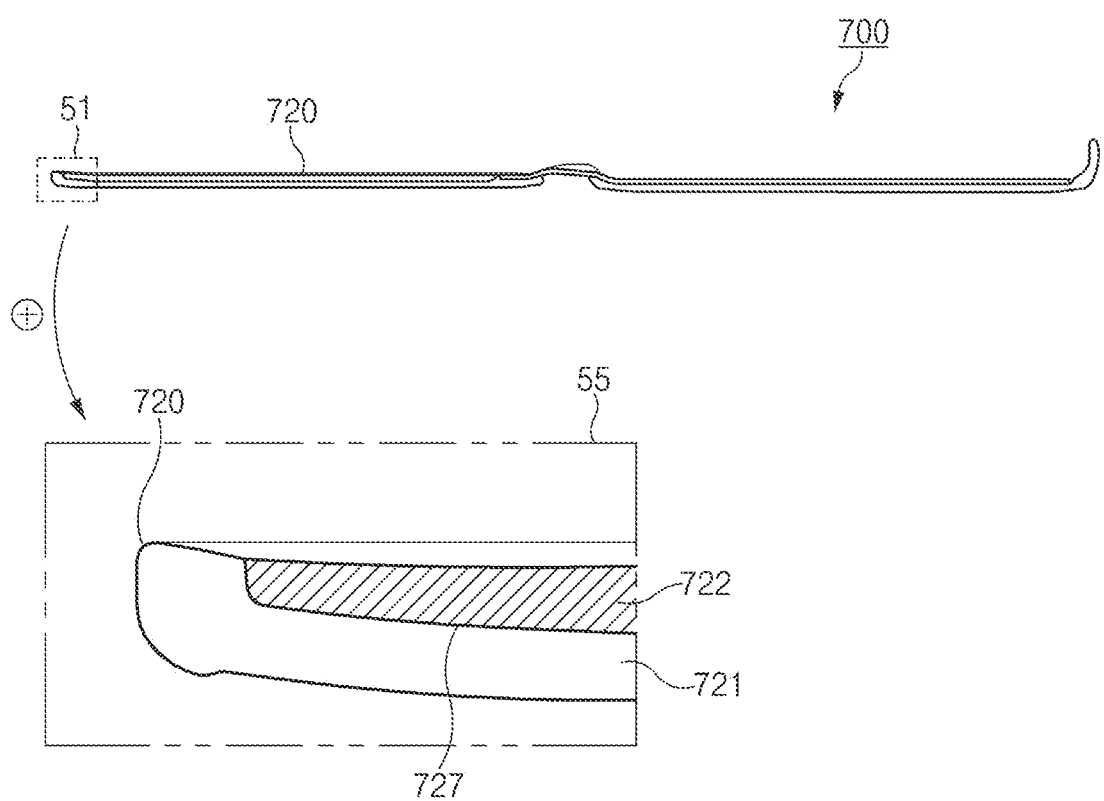
FIG. 8 is a sectional view illustrating the case combined with an electronic device according to an embodiment of the present disclosure.

FIG. 8 is a sectional view illustrating the case 700 combined with an electronic device according to an embodiment of the present disclosure.

The sectional view illustrated in FIG. 8 may correspond to an example of a section obtained by cutting the case 700 illustrated in FIG. 7 along a line 50 across the case 700. Referring to an enlarged image 55 of a partial area 51 of the cover 720 in the sectional view of FIG. 8, the cover 720 may include the base plate 721 and the soft material part 722.

According to an embodiment, the base plate 721 may include a fixing groove 727. According to an embodiment, the soft material part 722 may be inserted into the fixing groove 727 and combined with the base plate 721. According to an embodiment, the fixing groove 727 may be formed in an area including the center of the base plate 721.

According to an embodiment, the soft material part 722 may be disposed in the second direction (e.g., the second direction 12 of FIG. 1) from the base plate 721, with the cover 720 in a closed state (or may be disposed in the first direction (e.g., the first direction 11 of FIG. 1) from the base plate 721, with the cover 720 in an open state), in which the second direction is opposite to the first direction.

According to an embodiment, the soft material part 722 may be formed on the base plate 721 by double injection molding and may be attached to the base plate 721 without an intermediate film and an adhesive film.

Figure 9A:
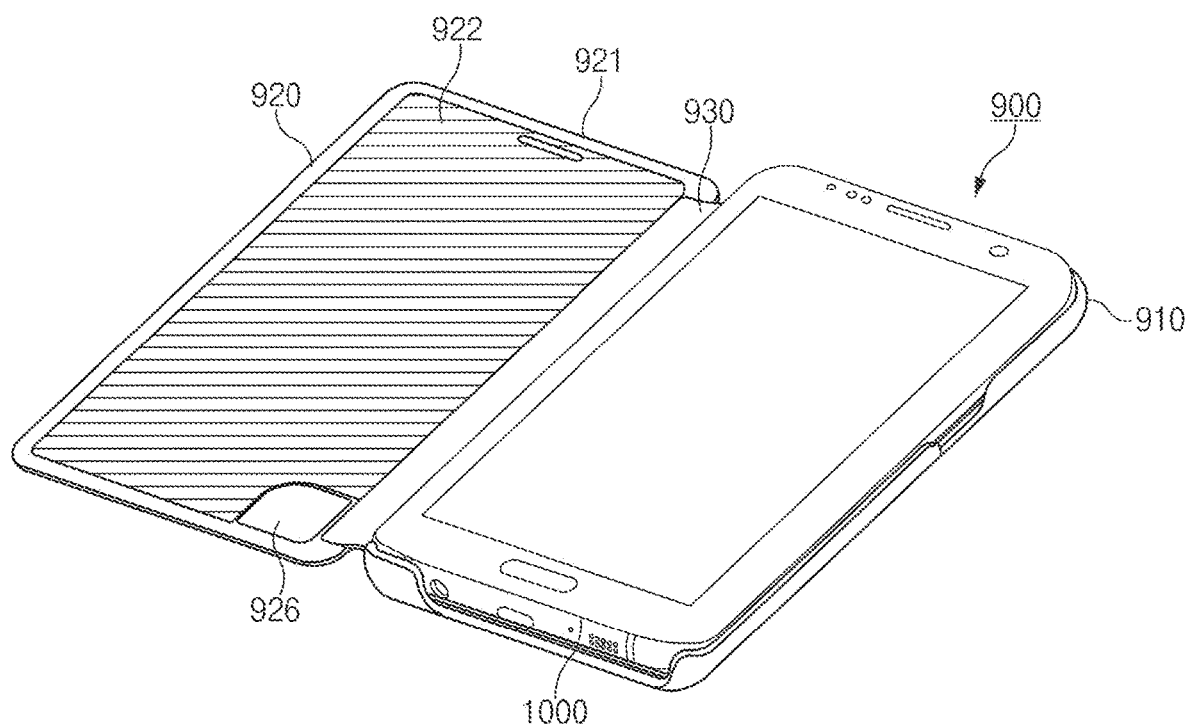
FIGS. 9A and 9B are views illustrating the structure of a case combined with an electronic device according to an embodiment of the present disclosure.
Figure 9B:
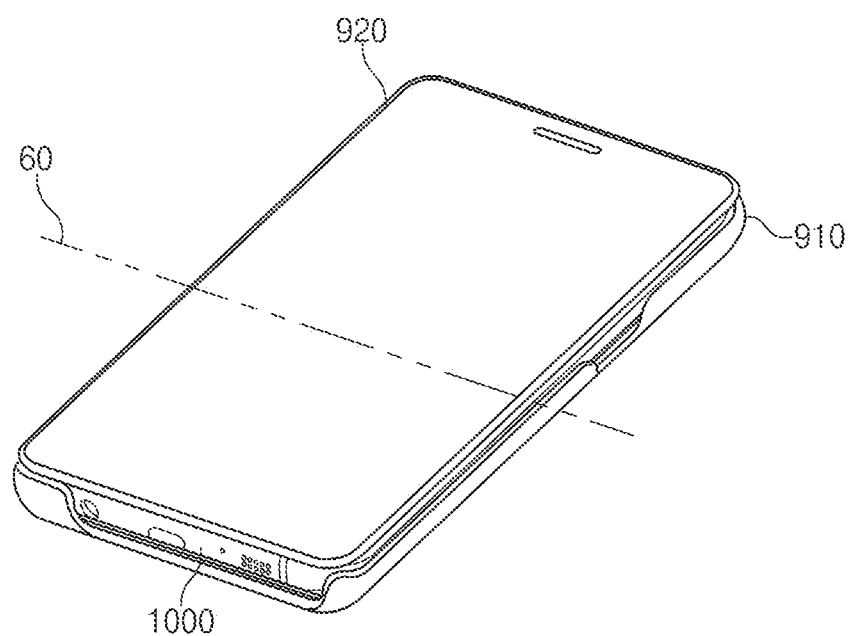

FIGS. 9A and 9B are views illustrating the structure of a case 900 combined with an electronic device 1000 according to an embodiment of the present disclosure.

FIG. 9A illustrates a state in which a cover 920 is open after the case 900 and the electronic device 1000 are combined together, and FIG. 9B illustrates a state in which the cover 920 is closed.

Referring to FIG. 9A, according to an embodiment, the case 900 may include a fastening part 910, the cover 920, and a connecting part 930. According to an embodiment, the cover 920 may include a base plate 921 and a soft material part 922. All the components of the case 900 illustrated in FIG. 9 except for the base plate 921 and the soft material part 922 are the same as, or similar to, those of the case 100 described above with reference to FIGS. 1 to 5. Therefore, the following descriptions of the base plate 921 and the soft material part 922 will be focused on the difference from the base plate 121 and the soft material part 122.

According to an embodiment, the soft material part 922 may be disposed in a second direction (e.g., the second direction 12 of FIG. 1), which is opposite to a first direction (e.g., the first direction 11 of FIG. 1), from the base plate 921 with the cover 920 in the closed state. For example, the soft material part 922 may be disposed to face a first surface (e.g., the first surface 21 of FIG. 1) of the electronic device 1000 (e.g., the electronic device 100 of FIG. 1), with the cover 920 in the closed state.

According to an embodiment, the soft material part 922 may be disposed in an area including the center of the base plate 921. According to an embodiment, the soft material part 922 may be disposed so as not to overlap a magnetic material 926 included in the cover 920.

Referring to FIG. 9B, the cover 920 may be in the closed state according to a movement of the connecting part 930.

Although not illustrated in FIG. 9, according to various embodiments, the cover 920 may further include at least one of an antistatic layer (or an antistatic film), an intermediate film (e.g., the intermediate film 123 of FIG. 3), an adhesive film (e.g., the adhesive film 124 of FIG. 3), and a surface film (e.g., the surface film 125 of FIG. 3).

According to an embodiment, the antistatic film may be disposed in the second direction (e.g., the second direction 12 of FIG. 1) from the soft material part 922 and may be disposed to face the first surface of the electronic device 1000. For example, the antistatic film may be disposed between the soft material part 922 and the first surface of the electronic device 1000, with the cover 920 in the closed state. According to an embodiment, the antistatic film may include silicone. According to an embodiment, the antistatic film may be formed on the soft material part 922 by coating (or painting). For example, the antistatic film may be coated on the soft material part 922 using silicone in a low-temperature environment. The antistatic film may be coated on the soft material part 922 by spray coating or electrostatic coating.

According to an embodiment, the intermediate film may be disposed between the base plate 921 and the soft material part 922. According to an embodiment, the intermediate film may be used as a base material for forming the soft material part 922. For example, the soft material part 922 may be formed on the intermediate film in the manufacturing process. According to an embodiment, the intermediate film may have a rigidity exceeding a specified value.

According to an embodiment, the adhesive film may be disposed between the base plate 921 and the intermediate film to bond the base plate 921 and the intermediate film. According to an embodiment, the adhesive film may be formed of a transparent (or translucent) material. For example, the adhesive film may be an optically clear adhesive (OCS) film.

According to an embodiment, the surface film may be disposed in the first direction from the base plate 921, with the cover 920 in the closed state (or may be disposed in the second direction (e.g., the second direction 12 of FIG. 1) from the base plate 921, with the cover 920 in the open state).

According to an embodiment, at least one of the base plate 921, the soft material part 922, the antistatic film, the intermediate film, the adhesive film, and the surface film may include a transparent material.

Figure 10:
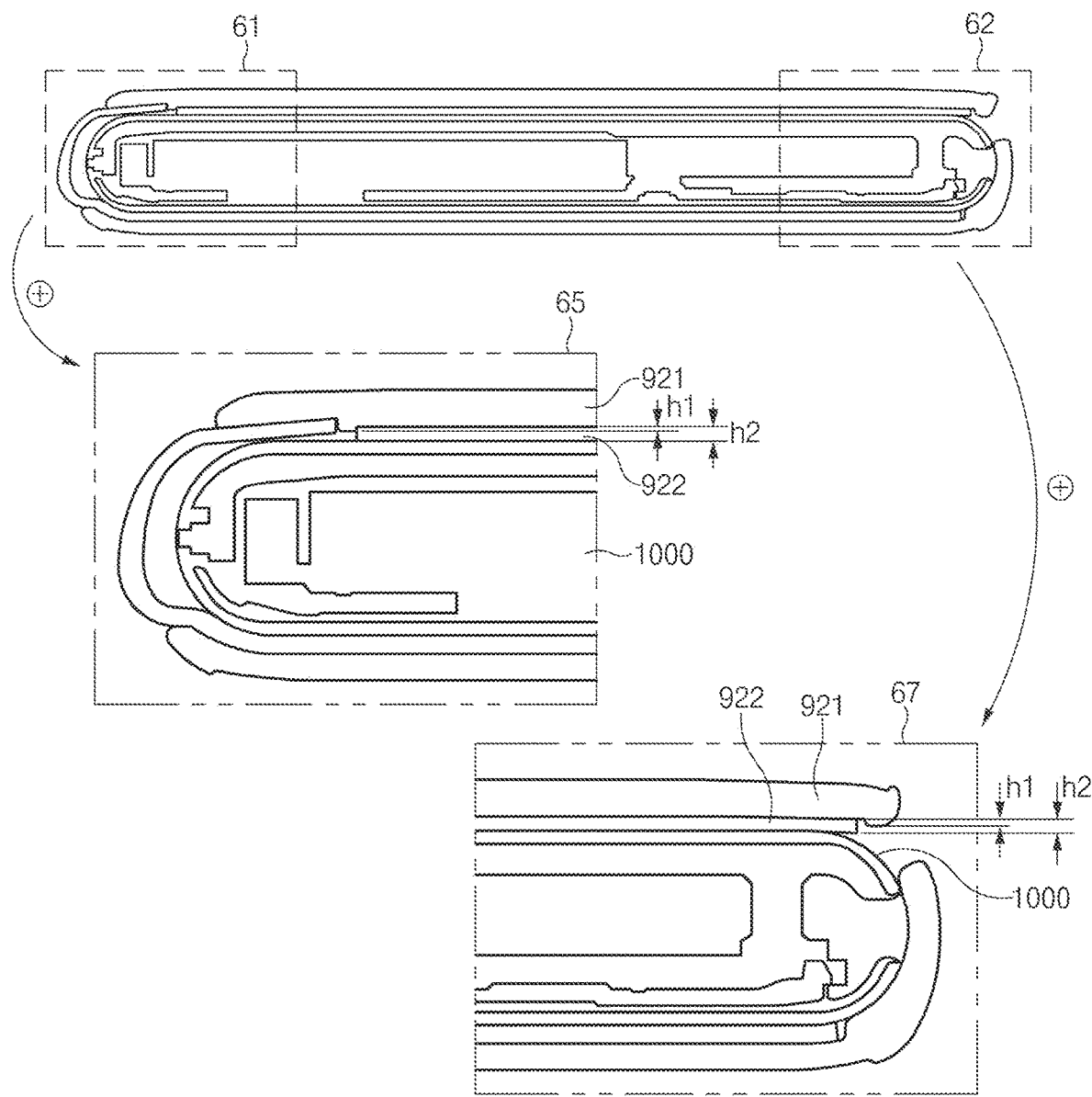
FIG. 10 is a sectional view illustrating the case combined with the electronic device according to an embodiment of the present disclosure.

FIG. 10 is a sectional view illustrating the case 900 combined with the electronic device 1000 according to an embodiment of the present disclosure.

The sectional view illustrated in FIG. 10 may correspond to an example of a section obtained by cutting the case 900 illustrated in FIG. 9B, which is combined with the electronic device 1000, along a line 60 across the case 900.

Referring to a first enlarged image 65 of a first area 61 and a second enlarged image 67 of a second area 62 in the sectional view of FIG. 10, at least a portion of a first surface of the base plate 921 that faces the first direction (e.g., the first direction 11 of FIG. 1) may have a curved surface shape, and an area of a second surface that faces the second direction (e.g., the second direction 12 of FIG. 1) and makes contact with the soft material part 922 may have a flat surface shape. For example, the base plate 921 may include, in at least a partial area of the second surface thereof, a fixing groove (e.g., the fixing groove 727 of FIG. 8) for fixing the soft material part 922. The fixing groove may have, for example, a flat surface shape. The soft material part 922 may be disposed in the fixing groove included in the base plate 921.

Referring to the first image 65 and the second image 67 in FIG. 10, according to an embodiment, the soft material part 922 included in the cover 920 may make contact with the electronic device 1000, with the cover 920 in the closed state. According to an embodiment, the height h2 of the soft material part 922 may be greater than the height h1 of the fixing groove. For example, the soft material part 922 may protrude 0.2 mm or less from the base plate 921. Accordingly, the soft material part 922 disposed in the fixing groove may make contact with the first surface (e.g., the cover glass or the housing) of the electronic device 1000.

As the soft material part 922 is disposed in the fixing groove in a flat surface shape, the soft material part 922 may uniformly contact the fixing groove, and the adhesion performance of the soft material part 922 to the base plate 921 may be enhanced.

Figure 11:
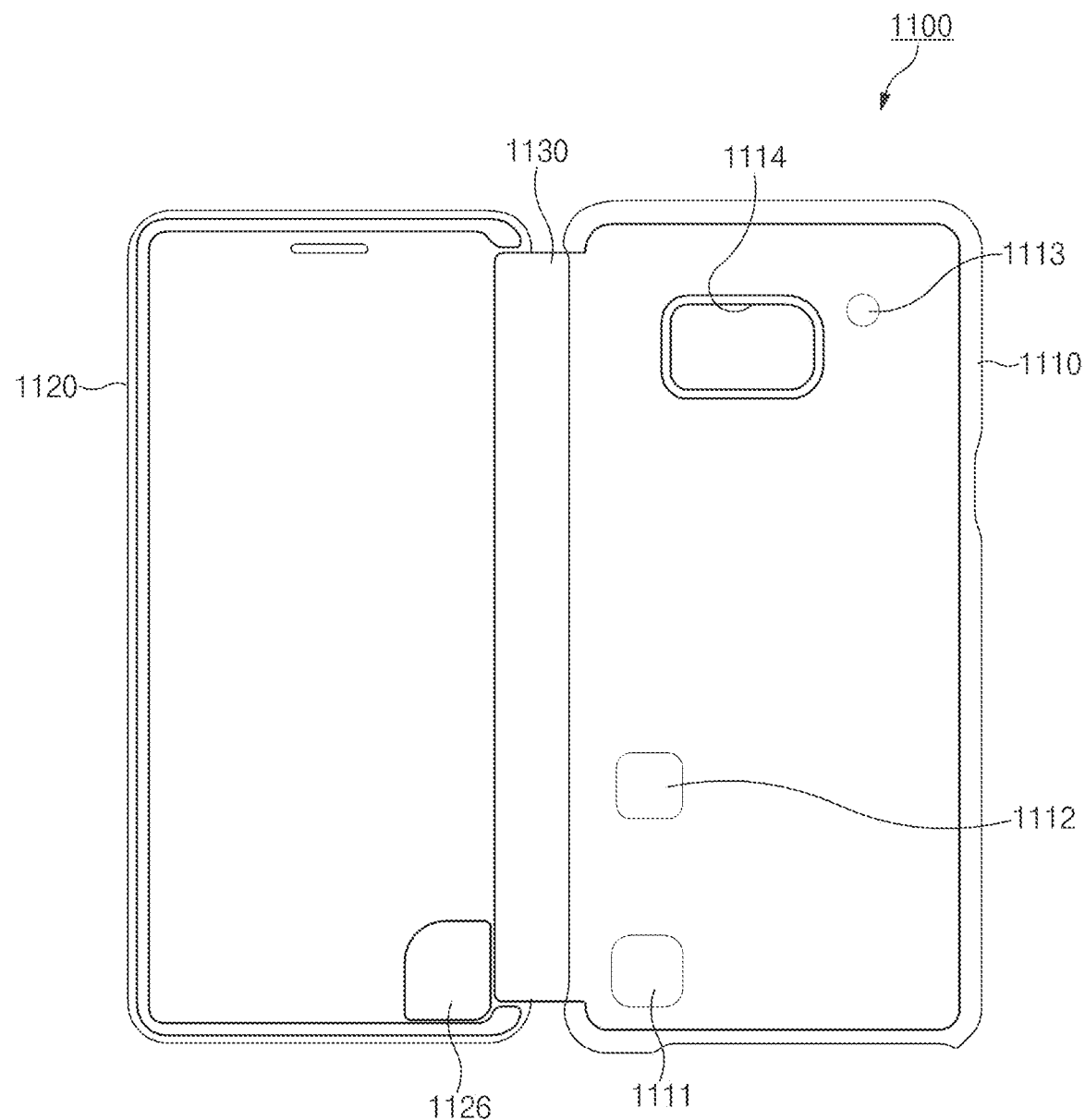
FIG. 11 is a view illustrating the structure of a case according to an embodiment of the present disclosure.

FIG. 11 is a view illustrating the structure of a case 1100 according to an embodiment of the present disclosure.

Referring to FIG. 11, the case 1100 (e.g., the case 100, 600, 700, or 900) may include a fastening part 1110, a cover 1120, and a connecting part 1130. According to an embodiment, the fastening part 1110 may include a steel shield plate 1111, an identification chip 1112, and a magnetic material 1113.

According to an embodiment, the steel shield plate 1111 may be disposed at a location that overlaps a magnetic material 1126 included in the cover 1120 in the state in which the cover 1120 is closed or in the state in which the cover 1120 is open and overlaps the rear surface of the fastening part 1110. When the cover 1120 in the open state overlaps the rear surface of the fastening part 1110, a Hall sensor included in an electronic device (e.g., the electronic device 200 of FIG. 1) may determine that the cover 1120 is in the closed state, by detecting the magnetic field generated by the magnetic material 1126 included in the cover 1120. According to an embodiment, when the cover 1120 in the open state overlaps the rear surface of the fastening part 1110, the steel shield plate 1111 may block the magnetic field generated by the magnetic material 1126 included in the cover 1120 and may prevent a malfunction of a first Hall sensor of the electronic device.

According to an embodiment, the identification chip 1112 may be electrically connected to the electronic device (e.g., the electronic device 200 of FIG. 1), with the fastening part 1110 combined with the electronic device. According to an embodiment, the identification chip 1112 may include identification information for identifying the type of the case 1100 or whether the case 1100 is a genuine product or not. According to an embodiment, the identification chip 1112 electrically connected to the electronic device may transmit the identification information to the electronic device, and the electronic device may determine the type of the case 1100 or whether the case 1100 is a genuine product or not, by using the identification information received from the identification chip 1112.

According to an embodiment, the magnetic material 1113 may generate a magnetic field. According to an embodiment, a second Hall sensor disposed on a second surface of the electronic device (e.g., the electronic device 200 of FIG. 1) may detect the intensity of the magnetic field generated by the magnetic material 1113. When the fastening part 1110 is combined with the electronic device, the intensity of the magnetic field detected by the second Hall sensor may vary, and the electronic device may detect whether the case 1100 (or the fastening part 1110) is combined with the electronic device, based on the intensity of the magnetic field.

The cases according to the various embodiments of the present disclosure include the soft material part disposed in at least a partial area of the cover to increase the coefficient of friction between the cover and an electronic device, thereby suppressing a movement of the cover. Accordingly, even though foreign matter is present between the cover and the electronic device, scratches due to the foreign matter may be prevented.

Figure 12:
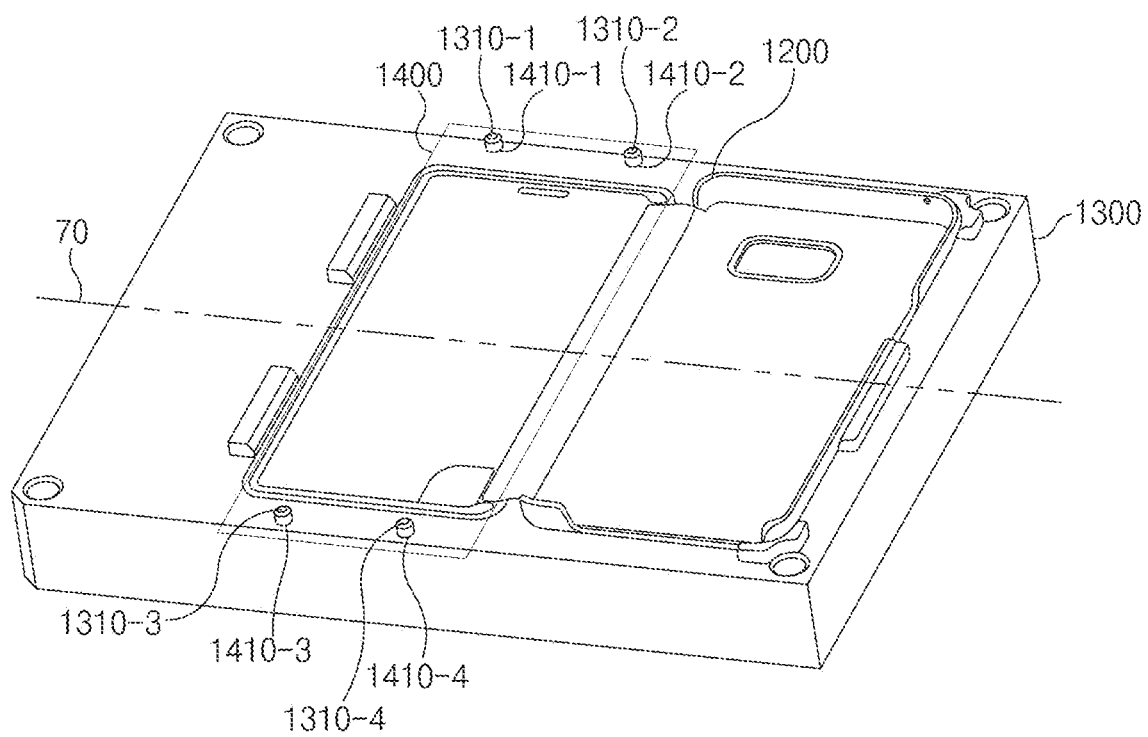
FIG. 12 is a view illustrating a case manufacturing process according to an embodiment of the present disclosure.

FIG. 12 is a view illustrating a case manufacturing process according to an embodiment of the present disclosure.

Referring to FIG. 12, a case 1200 may be fixed to a jig 1300 before a soft material part (e.g., the soft material part 120 of FIG. 3) is attached to the case 1200. According to an embodiment, the jig 1300 may include a plurality of fixing protrusions 1310-1, 1310-2, 1310-3, and 1310-4 for coupling a fixing plate 1400. According to an embodiment, the soft material part may be attached to the fixing plate 1400. According to an embodiment, the fixing plate 1400 may include a plurality of openings 1410-1, 1410-2, 1410-3, and 1410-4.

According to an embodiment, the plurality of fixing protrusions 1310-1, 1310-2, 1310-3, and 1310-4 included in the jig 1300 may be inserted into the plurality of openings 1410-1, 1410-2, 1410-3, and 1410-4 included in the fixing plate 1400. After the fixing plate 1400 is coupled to the jig 1300, the fixing plate 1400 may be restricted from moving toward a side (e.g., an upper side or a right side) and may move only in the vertical direction.

Figure 13:
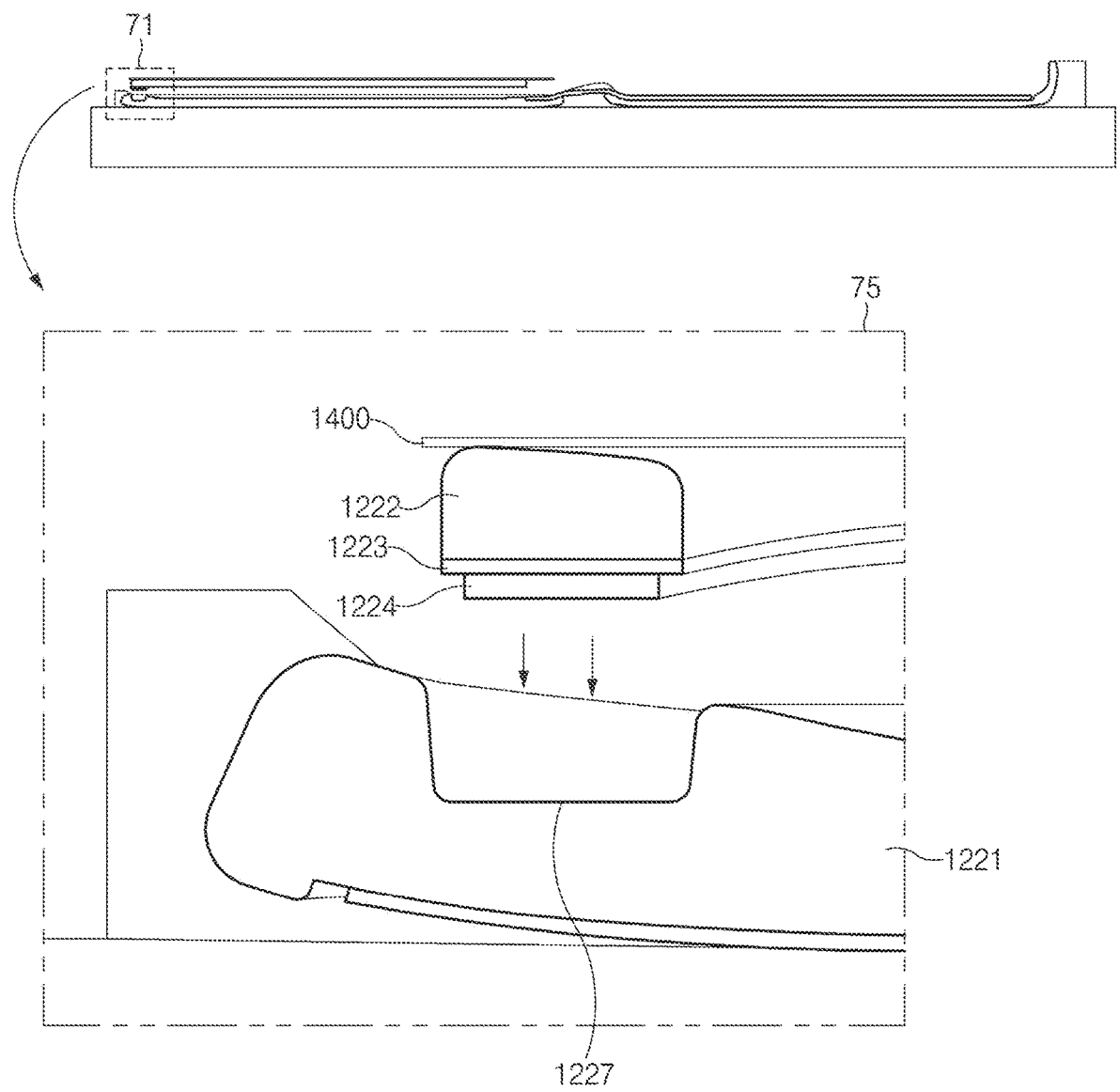
FIG. 13 is a sectional view illustrating the case manufacturing process according to various embodiments of the present disclosure.

FIG. 13 is a sectional view illustrating the case manufacturing process according to various embodiments of the present disclosure.

The sectional view illustrated in FIG. 13 may correspond to an example of a section obtained by cutting the case 1200 illustrated in FIG. 12 along a line 70 across the case 1200. Referring to an enlarged image 75 of a partial area 71 in the sectional view of FIG. 13, a soft material part 1222 may be attached to the fixing plate 1400. According to an embodiment, an intermediate film 1223 and an adhesive film 1224 may be attached to the soft material part 1222. According to an embodiment, the soft material part 1222 attached to the fixing plate 1400 may be inserted into a fixing groove 1227 of a base plate 1221 according to a movement of the fixing plate 1400.

According to the embodiment described with reference to FIGS. 12 and 13, the jig 1300 may restrict the movement of the case 1200 and the fixing plate 1400 having the soft material part 1222 attached thereto, thereby enabling the soft material part 1222 to be accurately attached to the fixing groove 1227 included in the base plate 1221.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A case for an electronic device, the case comprising:
   a fastening part attachable and detachable to and from at least part of the electronic device;
   a cover configured to cover a first surface of the electronic device that faces a first direction, when the cover is in a closed state; and
   a connecting part configured to connect the fastening part and the cover,
   wherein the cover includes:
      a base plate including:
         a first surface that faces the first direction, when the cover is in the closed state, the first surface having a curved surface shape,
         a second surface that faces a second direction and faces the electronic device, when the cover is in the closed state, the second direction being opposite to the first direction, and
         a fixing groove indented into the second surface of the base plate that faces the second direction, when the cover is in the closed state, wherein a soft material part is inserted to the fixing groove,
   wherein at least a portion of the soft material part makes contact with the first surface of the electronic device,
   wherein an area of the second surface of the base plate makes contact with the soft material part which has a flat surface shape, and
   wherein the base plate is formed of a rigid material.

2. The case of claim 1, wherein the base plate includes at least one of polycarbonate (PC) or acrylonitrile butadiene styrene (ABS).

3. The case of claim 1, wherein the soft material part includes at least one of silicone, rubber, thermoplastic elastomer (TPE), or thermoplastic silicone vulcanizate (TPSiV).

4. The case of claim 1, wherein the soft material part has a height greater than a height of the fixing groove.

5. The case of claim 1,
   wherein the cover further includes:
      an antistatic film disposed on the soft material part, when the cover is in the closed state, and
   wherein at least a portion of the antistatic film makes contact with the first surface of the electronic device.

6. The case of claim 1, wherein the cover further includes:
   an intermediate film disposed between an adhesive film and the soft material part; and
   the adhesive film disposed on the base plate between the base plate and the intermediate film to bond the base plate and the intermediate film.

7. The case of claim 6, wherein the intermediate film includes at least one of polycarbonate (PC), acrylonitrile butadiene styrene (ABS), or polyethylene terephthalate (PET).

8. The case of claim 7, wherein the adhesive film is disposed within the fixing groove of the base plate.

9. The case of claim 6, wherein the adhesive film is an optically clear adhesive (OCA) film.

10. The case of claim 1,
    wherein the cover further includes:
       a surface film disposed on the base plate, and
    wherein a graphic pattern is formed in at least a partial area of the surface film.

11. The case of claim 10, wherein the surface film includes at least one of polyethlyene terephthalate (PET), polyethylene (PE), or urethane.

12. The case of claim 1, wherein the base plate is formed of a transparent or translucent material.

13. The case of claim 1,
wherein the cover further includes a first magnetic material disposed in a partial area of the base plate, and
wherein the soft material part is disposed so as not to overlap the first magnetic material.

14. The case of claim 13, wherein the fastening part includes:
a steel shield plate disposed in an area overlapping the first magnetic material and configured to block a magnetic field of the first magnetic material, when the cover is open and placed up against the base plate.

15. The case of claim 1, wherein the fastening part includes:
an identification chip electrically connected to the electronic device, when the fastening part is attached to the electronic device, wherein the identification chip is configured to transmit, to the electronic device, identification information for identifying a type of the case or whether the case is a genuine product or not.

16. The case of claim 1, wherein the fastening part includes a magnetic material configured to be sensed by a sensor on a second surface of the electronic device, the second surface of the electronic device being opposite the first surface of the electronic device.

* * * * *